United States Patent [19]

Jennings

[11] Patent Number: 4,750,658
[45] Date of Patent: Jun. 14, 1988

[54] INSTRUMENT CARRIER FOR MOTORCYCLES

[76] Inventor: Oliver Jennings, 10205 Dr. Martin Luther King Dr., Chicago, Ill. 60628

[21] Appl. No.: 925,733

[22] Filed: Oct. 31, 1986

[51] Int. Cl.⁴ .......................... A45C 11/00; B62J 9/00
[52] U.S. Cl. .................................. 224/27 S; 224/901; 280/289 R; 296/37.5; 150/52 R
[58] Field of Search ...................... 224/901, 3 S, 30 R, 224/32 R, 27 S, 267; 150/52 R; 296/37.5, 3; 280/27, 200, 203, 205 R, 226 R, 309, 311, 289, 202

[56] References Cited

U.S. PATENT DOCUMENTS

| | | | |
|---|---|---|---|
| 3,081,807 | 3/1963 | Lightburn | 150/52 R |
| 3,947,954 | 4/1976 | Weiler | 224/32 R |
| 4,347,956 | 9/1982 | Berger | 150/52 R |
| 4,573,573 | 3/1986 | Favaro | 150/52 R |

Primary Examiner—Houston S. Bell, Jr.
Attorney, Agent, or Firm—Frank J. Uxa

[57] ABSTRACT

An apparatus useful as an instrument carrier in conjunction with a motorcycle having a fuel tank comprising: a base member including a cushion element adapted to be placed on the fuel tank when the apparatus is secured to the fuel tank; a strap associated with the base member and which is capable of being wrapped around the fuel tank to secure the apparatus to the fuel tank; and a top portion secured to the base member having a plurality of holes, and with the base member forming a compartment in which at least one instrument, e.g., sound transmitting device, can be placed.

20 Claims, 1 Drawing Sheet

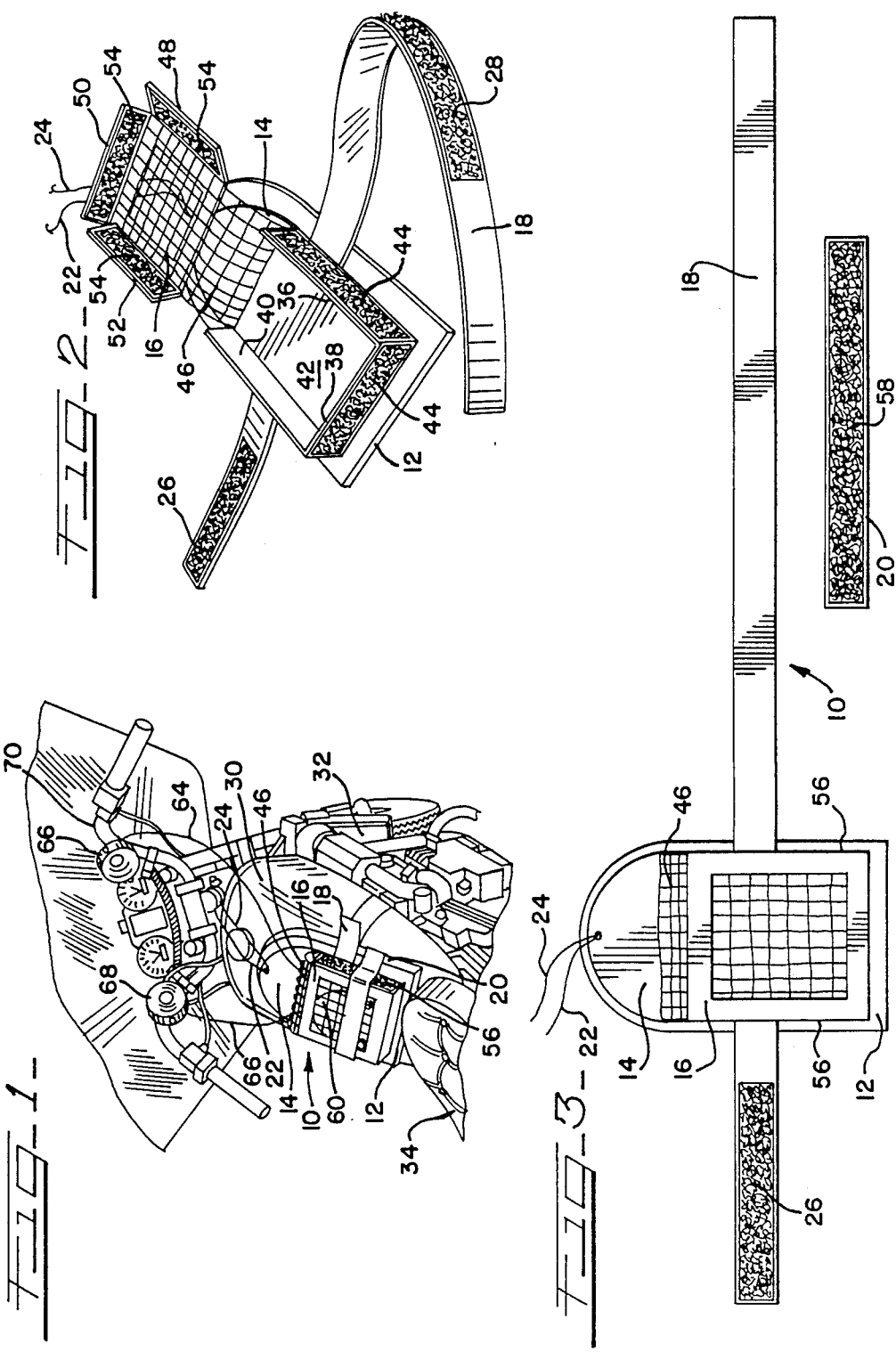

INSTRUMENT CARRIER FOR MOTORCYCLES

This invention relates to a carrier device for use in conjunction with motorcycles. More particularly, the invention relates to a carrier device for instruments, e.g., for sound transmitting devices such as tape cassette players, radios and the like, for use in conjunction with the fuel tanks of motorcycles.

Motorcyclists have devised various approaches for carrying cloths and other relatively large loads on their motorcycles. Many of these devices have involved securing the load to the cycle's fuel tank with rather complex strapping, suction and locking arrangements. In many instances, the holder or carrier is completely enclosed and relatively difficult to access. Moreover, these large prior devices are often unsuitable for carrying a relatively small item, e.g., a relatively sensitive instrument such as a radio, tape player, compact disc player and the like.

Sophisticated speaker systems, often attached to the handle bars, are available for motorcycles. However, there still remains a need to provide a convenient, safe place to put the sound instrument itself, e.g., radio, etc, on the motorcycle.

The following U.S. Patents were reviewed in preparing this application: Nos. 2,490,563; 2,588,671; 3,136,461; 3,944,924; 3,947,954; 4,059,207; 4,066,196; 4,359,233; 4,496,256; 4,566,617.

Therefore, one object of the present invention is to provide an instrument carrier for use in conjunction with a motorcycle. Other objects and advantages will become apparent hereinafter.

An apparatus useful as an instrument carrier in conjunction with a motorcycle having a fuel tank has been discovered. In a broad aspect, the present apparatus comprises: base means including a cushion means adapted to be placed on the fuel tank when the apparatus is secured to the fuel tank; strap means, preferably a single strap, associated with the base means and capable of being wrapped around the fuel tank to secure the apparatus to the fuel tank; and top means secured to the base means and with the base means forming a compartment, preferably a variably sized compartment, in which at least one instrument can be placed. In one embodiment, the top means includes a plurality of holes. In another embodiment, the apparatus further comprises means capable of acting in conjunction with at least one of the base means and the top means to reduce the size of the compartment, e.g., as desired. The various embodiments of the present invention are not exclusive of each other. That is, the feature or features of any embodiment can be used in any other embodiment unless clearly precluded by the nature of the feature and/or the other embodiment.

The present invention provides substantial advantages. For example, the plurality of holes present in the top means of certain embodiments allow for relatively easy access to the instrument while the instrument is in the compartment, for example, to adjust the instrument. These holes may also be convenient for allowing wires, e.g., from speaker systems, to be hooked up to the instrument in the compartment. In addition, these holes may aid in maintaining suitable environmental control, e.g., ventilation, which may be required for optimum performance of the instrument. Because the instruments to be placed in the compartment are often relatively sensitive or delicate, such instruments would benefit from being immobilized while in the compartment. Thus, in embodiments of the present system which include means to reduce the size of the compartment, the instrument is preferably held in place in the compartment regardless of the size of the instrument. In this manner, damage to the instrument caused by movement in the compartment is eliminated. Further, the system is easy to secure to and remove from the motorcycle fuel tank. In short, the present system provides a very effective way to safely carry relatively sensitive and sophisticated instruments on motorcycles.

The present apparatus preferably further comprises stabilizing means secured to the base means and adapted to be removably fastened around a component of the motorcycle other than the fuel tank to stabilize the position of the apparatus on the fuel tank. For example, the stabilizing means may comprise a pair of elongated cords or wires which extend outwardly from the base and which can be tied to the front frame of the motorcycle. When in place these cords act to help maintain the base means on top of the fuel tank.

The top means is preferably structured to be at least partially removable from the base means to allow the instrument to be placed in the compartment. Preferably, the top means is substantially permanently affixed to the base means. In the embodiment in which the top means includes a plurality of holes, the top means preferably includes a top portion constructed of netting to provide the plurality of holes. This top portion preferably acts as the ceiling or top of the compartment. Such netting has been found to be sufficiently durable to form part of the compartment for the instrument. Also, the netting is preferably flexible which helps to provide that the size of compartment can be varied, as desired.

The base means preferably includes an end wall which acts as the floor or bottom of the compartment. Also, the base means preferably includes at least one sidewall, more preferably a plurality of sidewalls, acting to at least partially define the compartment. In this embodiment, the top means preferably includes at least one sidewall, preferably a plurality of sidewalls, adapted to be removably secured to the sidewall or sidewalls of the base means. More preferably, the sidewall or sidewalls of the base means carries loops or hooks and the sidewall or sidewalls of the top means carries hooks or loops, adapted to be removably fastened to the loops or hooks carried by the sidewall or sidewalls of the base means. Still more preferably, the base means and the top means each include three such removably securable sidewalls. Examples of such hook/loop fasteners are Velcro fasteners.

The presently useful strap means is preferably a single strap. In one embodiment, the strap means is removably fitted between the floor or bottom of the compartment and the cushion means, e.g., through one or two loops extending downwardly from the opposite side of the bottom of the compartment. Thus, in this embodiment, the strap means is not permanently affixed to the base means. Preferably, the strap means, more preferably the single strap, includes a first segment carrying hooks and a second segment carrying loops such that such hooks and loops are engagable when the strap means is wrapped around the fuel tank.

As noted above, in one embodiment, the present instrument carrier includes means capable of acting in conjunction with at least one of the base means and the top means to change, e.g., reduce, the size of the compartment, e.g., to a size more effective in holding the instrument placed in the compartment. Preferably, this means comprises a strip capable of being removably attached to at least one of the base and the top means. More preferably, this strip is removably attached to the base means and/or the top means by at least one hook and loop combination. When such means is included, it is preferred that the compartment be flexibly structured to allow for the desired change, e.g., reduction, in size.

The compartment itself may be of any suitable size and shape. Because the instruments often desired to be carried in the present carrier are relatively small, the interior volume of the compartment (prior to being reduced by the action of the above-noted means) is preferably less than about 300 cubic inches, more preferably less than about 150 cubic inches.

These and other aspects and advantages of the present invention will become apparent in the following detailed description and claims, particularly when considered in conjunction with the accompanying drawings in which like parts bear like reference numerals. In the drawings:

FIG. 1 is a top side view, in prespective showing an embodiment of the present instrument carrier in use on a motorcycle.

FIG. 2 is a top side view, in prespective of certain components of the instrument carrier shown in FIG. 1 opened to allow placement of an instrument into the carrier.

FIG. 3 is a top plan view of the instrument carrier shown in FIG. 1.

Referring now to the drawings, an instrument carrier shown generally as 10, includes a resilient foam cushion 12, a base 14, a top 16, a securement strap 18, a strip 20 and two stabilizing cords 22 and 24.

Base 14 is adhesively secured to the top surface of cushion 12 at both ends. Strap 18 is fitted into two loops (not shown) on the underside of base 14 and is thus situated between cushion 12 and base 14. Strap 18 is substantially freely slidable in these two loops so that the relative lengths of strap 18 extending on either side of base 14 can be adjusted, as desired. Strap 18 also includes a hook strip 26 secured near the end of one side of strap 18 and a corresponding loop strip 28 secured to the other side of strap 18.

Strap 18 is employed to secure instrument carrier 10 to the fuel tank 30 of motorcycle 32. Thus, with instrument carrier 10 placed on top of fuel tank 30 and cushion 12 abutting motorcycle seat 34, strap 18 is placed around fuel tank 30 and hook strip 26 and loop strip 28 are brought together to fasten or lock or secure instrument carrier 10 in place on fuel tank 30. Instrument carrier 10 can easily be removed from fuel tank 30 simply by disengaging hook strip 26 from loop strip 28.

The top of base 14 includes a small hole 36 through base 14 which acts to secure stabilizing cords 22 and 24 to base 14. With strap 18 in place around fuel tank 30, stabilizing cords 22 and 24 are tied around a part of the front frame of motorcycle 32 which is stationary relative to fuel tank 30. With stabilizing cords 22 and 24 tied as described above, the position of instrument carrier on top of fuel tank 30 is more stabilized. In other words, the tied stabilizing cords 22 and 24 act to reduce the possibility that instrument carrier 10 will move from the top of fuel tank 30.

Base 14 includes three sidewalls 36, 38 and 40 which extend upwardly relative to cushion 12, and a floor 42. The outside surface of each of the three sidewalls 36, 38 and 40 are substantially covered with hook elements 44.

Top 16 includes netting 46 which is adhesively secured to base 14 and to three sidewalls 48, 50 and 52. Loop elements 54 substantially cover the inside surface of each of the three sidewalls 48, 50 and 52. Sidewalls 48, 50 and 52 are structured and sized so that the inside surfaces of sidewalls 48, 50 and 52 can be placed on and secured to (by the engagement of hook elements 44 and loop elements 54) the outside surfaces of sidewall 36, 38 and 40, respectively. With sidewalls 48, 50 and 52 in place on sidewalls 36, 38 and 40, respectively, as described above, base 14 and top 16 define a compartment into which an instrument, e.g., radio, tape player, compact disc player and the like, can be placed. The various components of base 14 and top 16 are constructed of relatively flexible material so that the size and/or shape of the compartment can be reduced and/or adjusted as desired to suit a particular application involved.

The outside surface of sidewalls 48 and 52 are substantially covered by loop elements 56 which are adapted to engage the hoop element 58 which substantially covers one side of strip 20. The size of the instrument compartment can be reduced, as desired, by placing strip 20 over top 16 (as shown in Figure 1) and securing hoop element 58 to the loop elements 56 on both sidewalls 48 and 52.

The functioning of instrument carrier 10 is illustrated as follows. Instrument carrier is placed on top of fuel tank 30 as described above. Sidewalls 48, 50 and 52 of top 16 are disengaged from sidewalls 36, 38 and 40. A compact disc player 60 is placed on floor 42. Two wires 62 and 64 attached to player 60 are run through netting 46 and are attached to speakers 66 and 68, respectively, which are carried by the handle bars 70 of motorcycle 32. Sidewalls 48, 50 and 52 are then secured to sidewalls 36, 38 and 40, respectively. Strip 20 is placed across top 16 and attached to loop elements 56 thereby reducing the size of the compartment and effectively immobilizing player 60 in the compartment. Player 60 can now be safely played while motorcycle 32 is in motion to provide entertainment/information. The volume and other settings of player 60 can be easily adjusted through netting 46 without disturbing instrument carrier 10. When leaving motorcycle 32, instrument carrier 10 can be easily and quickly removed from fuel tank 30, thereby avoiding theft and/or vandalism of the instrument in the compartment.

The present instrument carrier is relatively inexpensive to manufacture and easy to use. Substantial flexibility is built into the present system to provide for safe and effective carrying of relatively sensitive instruments.

While the invention has been described with respect to various specific examples and embodiments, it is to be understood that the invention is not limited thereto and that it can be variously practiced within the scope of the following claims.

The embodiments of the present invention in which an exclusive property of privilege is claimed are as follows:

1. An apparatus useful as an instrument carrier in conjunction with a motorcycle having a fuel tank comprising:

base means including a cushion means adapted to be placed on said fuel tank when said apparatus is secured to said fuel tank;

strap means associated with said base means and capable of being wrapped around said fuel tank to secure said apparatus to said fuel tank; and top means secured to said base means having a plurality of holes, and with said base means forming a compartment in which at least one of said instruments can be placed.

2. The apparatus of claim 1 which further comprises stabilizing means secured to said base means and adapted to be removably fastened around a component of said motorcycle other than said fuel tank to stabilize the position of said apparatus on said fuel tank.

3. The apparatus of claim 1 wherein said top means is structured to be at least partially removable from said base means to allow said instrument to be placed in said compartment.

4. The apparatus of claim 1 wherein said base means includes at least one sidewall acting to at least partially define said compartment.

5. The apparatus of claim 4 wherein said top means includes at least one sidewall adapted to be removably secured to said sidewall of said base means.

6. The apparatus of claim 5 wherein said sidewall of said base means carries loops or hooks and said sidewall of said top means carries hooks or loops adapted to be removably fastened to the loops or hooks carried by said sidewall of said base means.

7. The apparatus of claim 1 wherein said top means is substantially permanently affixed to said base means.

8. the apparatus of claim 1 wherein said top means includes a top portion constructed of netting to provide said plurality of holes.

9. The apparatus of claim 1 wherein said cushion means include a resilient foam cushion.

10. The apparatus of claim 1 wherein said strap means includes a first segment carrying hooks and a second segment carrying loops such that said hooks and loops are engagable when said strap means is wrapped around said fuel tank.

11. The apparatus of claim 1 which further comprises means capable of acting in conjunction with at least one of said base means and said top means to reduce the size of said compartment.

12. An apparatus useful as an instrument carrier in conjunction with a motorcycle having a fuel tank comprising:

base means including a cushion means adapted to be placed on said fuel tank when said apparatus is secured to said fuel tank;

strap means associated with said base means and capable of being wrapped around said fuel tank to secure said apparatus to said fuel tank;

top means secured to said base means, and with said base means forming a compartment in which at least one of said instruments can be placed; and means capable of acting in conjunction with at least one said base means and said top means to reduce the size of said compartment.

13. The apparatus of claim 12 wherein said means comprises a strip capable of being removably attached to at least one of said base means and said top means.

14. The apparatus of claim 12 wherein said strip is removably attached to at least one of said base means and said top means by at least one hook and loop combination.

15. The apparatus of claim 12 which further comprises stabilizing means secured to said base means and adapted to be removably fastened around a component of said motorcycle other than said fuel tank to stabilize the position of said apparatus on said fuel tank.

16. The apparatus of claim 12 wherein said top means is structured to be at least partially removable from said base means to allow said instrument to be placed in said compartment.

17. The apparatus of claim 12 wherein said base means includes at least one sidewall acting to at least partially define said compartment.

18. The apparatus of claim 12 wherein said top means includes at least one sidewall adapted to be removably secured to said sidewall of said base means.

19. The apparatus of claim 12 wherein said sidewall of said base means carried loops or hooks and said sidewall of said top means carries hooks or loops adapted to be removably fastened to the loops or hooks carried by said sidewall of said base means.

20. The apparatus of claim 12 which further comprises means capable of acting in conjunction with at least one of said base means and said top means to reduce the size of said compartment.

* * * * *